(No Model.)
J. BENNITT.
THRASHING MACHINE.
No. 261,126. Patented July 18, 1882.
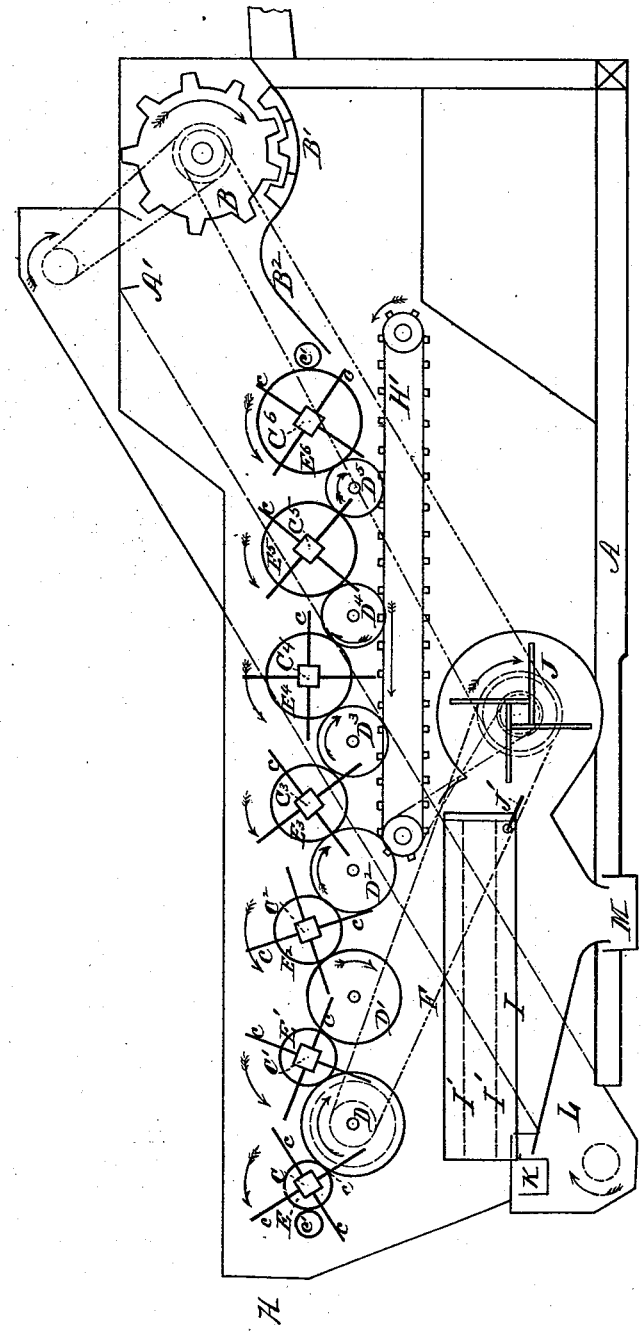
Witnesses.
Samuel E. Thomas
Henry F. Luelch
Inventor,
Joel Bennitt
By W. W. Leggett,
Attorney.

UNITED STATES PATENT OFFICE.

JOEL BENNITT, OF PALO, MICHIGAN.

THRASHING-MACHINE.

SPECIFICATION forming part of Letters Patent No. 261,126, dated July 18, 1882.

Application filed June 6, 1881. (No model.)

*To all whom it may concern:*

Be it known that I, JOEL BENNITT, of Palo, county of Ionia, State of Michigan, have invented a new and useful Improvement in Thrashing-Machines; and I declare the following to be a full, clear, and exact description of the same, such as will enable others skilled in the art to which it pertains to make and use it, reference being had to the accompanying drawings, which form a part of this specification.

My invention consists of the combinations of devices and appliances hereinafter described, and more fully pointed out in the claim.

The drawing represents a longitudinal vertical section, illustrating the essential features of my invention.

This invention relates to thrashing-machines of the class in which rotary rakes are employed to move the straw from the machine; and it consists in a novel combination of devices for accelerating the speed of the successive rakes in a series of rotary rakes arranged to carry the straw from the thrashing-cylinder, as will be hereinafter particularly described.

A is the frame-work of a thrashing-machine, B its thrashing-cylinder, and B' its concave; $B^2$, a guide-board which directs the products of the cylinder out upon the separating devices.

The separating devices consist of a series of shafts, C C' $C^2$, &c., bearing at suitable intervals iron teeth or fingers $c$. At the side of the machine, and either upon the inside or the outside, are pulley-wheels E E' $E^2$, &c., which mesh preferably by frictional contact with a series of idle pulleys, D D' $D^2$, &c., so that the whole series may be operated by power applied to any pulley, but preferably at the pulley D. I prefer that this pulley be geared by belt F and cone-pulleys G G' with the fan-shaft, so that by shifting the belt on the pulleys the speed of the shafts C C' $C^2$ may be graduated to suit different qualities of grain or straw. It will be observed that the idle pulleys and the shaft-pulleys decrease in size respectively to each other in an inverse order, the object being to cause the shafts to move with increasing velocity from the thrashing-cylinder to the exit-point H.

H' is a raddle-belt, which conveys the seed and chaff that is dropped upon it forward to the sieve-frame and delivers it upon the sieves.

I represents the sieve-frame, with its sieves I'. This is provided with any ordinary means (not shown) for imparting to the sieves a lateral vibration, and also longitudinal, if desired, though the blast of the fan will usually be sufficient for feeding the chaff off the sieves.

J is the fan.

K is the tailings-spout, provided with any suitable means (not shown) for directing its contents into an elevator, L, which elevates it back in front of the thrashing-cylinder to be passed again over the sieves.

M is the seed-box or spout for collecting the seed or delivering it out at the side of the machine.

The operation of the machine proper is as follows: Grain fed to the thrashing-cylinder is thrashed and thrown rearward just within reach of the teeth or fingers $c$ of the shaft $C^6$. These fingers catch the straw, loosen it up, and pass it over to the next shaft, which, moving a little faster, grasps it and throws it to the next, and so on, and as it moves from shaft to shaft it is hurried faster and faster and becomes therefore thinner and thinner. In this process the grain is quickly separated and falls below upon the raddle-belt H', which conveys it and the chaff upon the sieves, where it is subjected to the action of the fan in the usual way, and the tailings are subjected to a second operation.

A wing-board, J', may serve to give proper direction to the blast from the fan.

A machine made upon this plan is light running, is quite noiseless, is not liable to clog up, and will run with little or no jarring. Moreover the separation is more nearly perfect than with any system of bolts with which I am acquainted.

The portion A' of the frame I preferably enlarge, so as to give a free and unimpeded course to the straw and chaff as it emerges from the thrashing-cylinder.

$c'$ represents idle pulleys, whose sole function is to receive the thrust from the intermediate pulleys, and thus hold them all to their work.

I am aware that rakes and aprons in series in thrashing-machines have been accelerated successively; and I do not claim such construction broadly.

What I claim is—

The combination, with the thrashing-cylinder, of the series of rake-shafts, the series of pulleys mounted thereon and decreasing in diameter successively from said cylinder, and the series of driving-pulleys increasing in diameter in the same order and engaging with the rake-shaft pulleys, and means for communicating rotary motion to one of said driving-pulleys, substantially as described.

In testimony whereof I sign this specification in the presence of two witnesses.

JOEL BENNITT.

Witnesses:
 HENRY MILLER,
 RICHARD MILLER.